(12) United States Patent
Nelson et al.

(10) Patent No.: US 8,212,655 B2
(45) Date of Patent: Jul. 3, 2012

(54) SYSTEM AND METHOD FOR IDENTIFICATION OF PROCESS COMPONENTS

(75) Inventors: Nathan Steven Nelson, Plymouth, MN (US); Ross Charles LaMothe, Eden Prairie, MN (US)

(73) Assignee: Rosemount Inc., Chanhassen, MN (US)

( * ) Notice: Subject to any disclaimer, the term of this patent is extended or adjusted under 35 U.S.C. 154(b) by 1151 days.

(21) Appl. No.: 11/394,894

(22) Filed: Mar. 30, 2006

(65) Prior Publication Data

US 2007/0229229 A1    Oct. 4, 2007

(51) Int. Cl.
*H04Q 5/22* (2006.01)
*F16K 17/34* (2006.01)
*F16K 31/12* (2006.01)

(52) U.S. Cl. .................. 340/10.41; 340/10.1; 137/487.5

(58) Field of Classification Search ................. 340/10.1, 340/870.01, 10.41; 710/8
See application file for complete search history.

(56) References Cited

U.S. PATENT DOCUMENTS

| | | | |
|---|---|---|---|
| 6,427,913 B1 | 8/2002 | Maloney | |
| 6,563,417 B1 | 5/2003 | Shaw | |
| 6,693,539 B2 | 2/2004 | Bowers et al. | |
| 6,758,397 B2 | 7/2004 | Catan | |
| 6,778,096 B1 | 8/2004 | Ward et al. | |
| 6,834,248 B1 | 12/2004 | Green et al. | |
| 6,856,257 B1 * | 2/2005 | Van Heteren | 340/870.03 |
| 6,889,165 B2 | 5/2005 | Lind et al. | |
| 2001/0032674 A1 * | 10/2001 | Brunet et al. | 137/487.5 |
| 2003/0229730 A1 * | 12/2003 | Pedrazzini et al. | 710/8 |
| 2005/0116021 A1 * | 6/2005 | O'Dougherty et al. | 235/375 |
| 2005/0258962 A1 * | 11/2005 | Phipps et al. | 340/572.1 |
| 2006/0022801 A1 * | 2/2006 | Husak et al. | 340/10.5 |
| 2007/0027459 A1 * | 2/2007 | Horvath et al. | 606/147 |
| 2009/0079541 A1 * | 3/2009 | Alsafadi | 340/10.1 |

OTHER PUBLICATIONS

Office Action dated Apr. 26, 2011, of the Chinese State Intellectual Property Office in counterpart foreign application No. 200780018332.0, filed Nov. 19, 2008.

* cited by examiner

*Primary Examiner* — Benjamin C Lee
*Assistant Examiner* — Cal Eustaquio
(74) *Attorney, Agent, or Firm* — Kinney & Lange, P.A.

(57) ABSTRACT

A RFID transceiver interrogates RFID tags located on process components and provides identification data stored on the RFID tags to a process measurement device coupled to the process components. Based on the identification data received, the process measurement device configures itself to interpret data provided by the process components. Proper configuration allows the process measurement device to provide meaningful process data to a control room.

23 Claims, 5 Drawing Sheets

SYSTEM AND METHOD FOR IDENTIFICATION OF PROCESS COMPONENTS

BACKGROUND OF THE INVENTION

The present invention relates to industrial process control and monitoring. More particularly, the present invention relates to wireless identification of process monitoring and control components connected to a process measurement device or transmitter.

A process measurement point is a system that remotely or locally monitors process characteristics used in an industrial process, such as pressure, temperature, flow and level. The process measurement point includes a process measurement device or transmitter connected to receive input (electrical or mechanical) from individual process components connected to the process measurement device. The process measurement device converts the mechanical or electrical input received from the individual components into an output, which is communicated to a control room via a standard analog or digital communication system (e.g., HART, Fieldbus, Profibus, Modbus, deviceNet, etc.).

To accurately convert mechanical or electrical input received from individual process components, the process measurement device must be configured based on the individual process components providing input. For instance, a process measurement device receiving mechanical input data regarding flow (i.e., velocity, pressure, etc.) of a process fluid through a primary element (i.e., a type of process component) needs to be configured based on the particular type of primary element used.

A number of situations can arise which result in the process measurement device being improperly configured. For instance, errors can occur when the process measurement point system is initially configured. Configuration of the process measurement device is typically done manually, in which an operator enters identifying details concerning process components connected to the process measurement device (e.g., type of process component). This is a tedious and error prone process. If identifying data with respect to a particular process component is entered incorrectly, the process measurement device will not be able to properly interpret data provided by the process component.

Another situation that can lead to improper configuration of the process measurement device involves mistakes made in replacing process components. After time, model and part numbers located on the process components often become worn and hard to read, leading to confusion regarding the identity of the process component being replaced. If the incorrect component is used as a replacement, the process measurement device may provide erroneous results.

It would therefore be beneficial to develop a process measurement point system that eliminates the need for manually configuring the process measurement device, as well as a system that reduces mistakes associated with replacing process components.

BRIEF SUMMARY OF THE INVENTION

The present invention provides a system and method of configuring a process measurement point system. In one embodiment, the process measurement point system includes a plurality of process components, wherein each of the plurality of process components includes a radio frequency identification (RFID) tag that stores identifying information regarding the process component. The process measurement point system also includes a process measurement device connected to provide process measurement data to a control room based on mechanical and/or electrical input received from at least one of the plurality of process components. An RFID transceiver is used to interrogate the RFID tag associated with each of the plurality of process components. The process measurement device is configured to interpret input received from at least one of the plurality of process components based on the identifying information.

DETAILED DESCRIPTION

Figure 1:
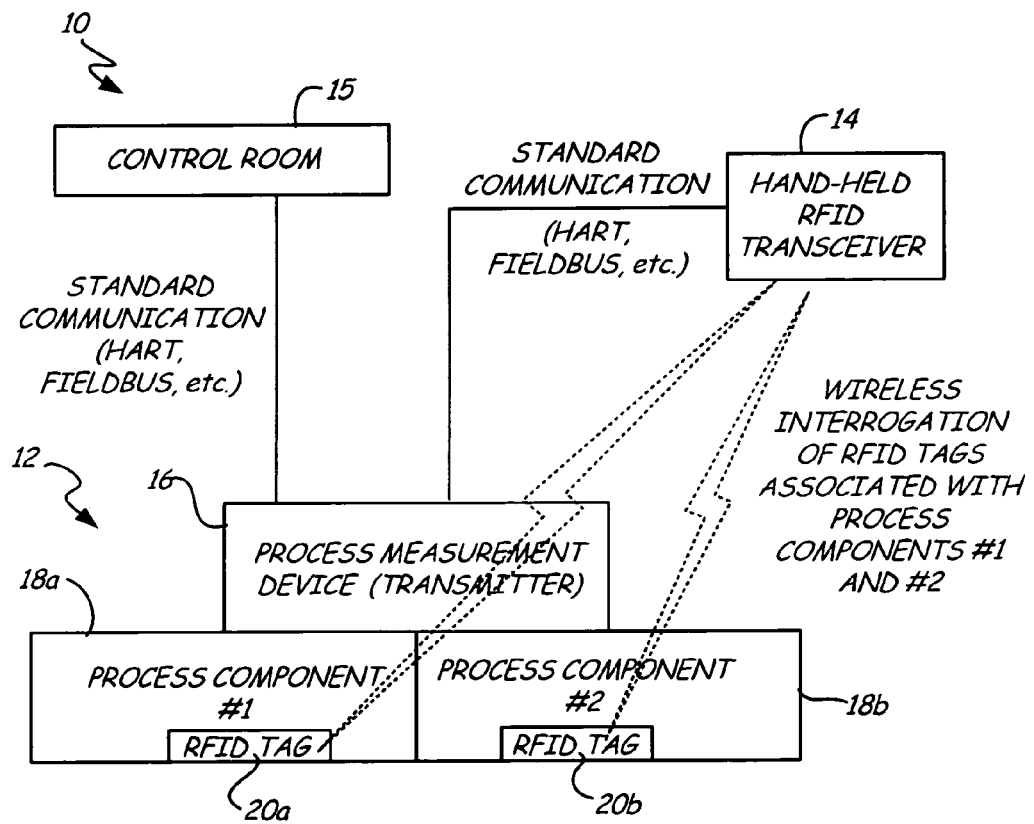
FIG. 1 is a functional block diagram of a process measurement point system of the present invention having a hand-held transceiver for interrogating RFID tags located on process components.

FIG. 1 shows an exemplary embodiment of process system 10, including process measurement point system 12, hand-held radio frequency identification (RFID) transceiver 14, and control room 15. Process measurement point system 12 includes process measurement device (or transmitter) 16, process components 18a and 18b, and RFID tags 20a and 20b. RFID tag 20a stores data identifying process component 18a, and RFID tag 20b stores data identifying second process component 18b. In an embodiment of the present invention, hand-held RFID transceiver 14 communicates wirelessly with RFID tags 20a and 20b, receiving identifying information regarding process components 18a and 18b, respectively. The identifying information is provided to process measurement device 16, which uses the identifying information to automatically configure itself to properly interpret data provided by process components 18a and 18b.

Process measurement device 16 is connected to receive input (mechanical or electrical) from process components 18a and 18b. Each process component may provide individual or multiple inputs, or several process components may together provide a single input to process measurement device 16. Based on input received from process components 18a and 18b, process measurement device 16 interprets and in some cases calculates process measurement data associated with the process. Process measurement device communicates process data to control room 15 using a standard analog or digital communication system (such as HART or Fieldbus).

In order to provide meaningful data to control room 15, process measurement device 16 must be properly configured based on the type of connected process components. For instance, if process component 18a is a primary element, process measurement device 16 must be configured based on the properties of the primary element (e.g., primary element type, size, shape, etc.) to properly interpret pressure data received from a pressure sensor in order to calculate flow rate data. If process measurement device 16 is configured based on the wrong type of primary element, then process data provided by process measurement device 16 will not accurately reflect current process conditions. Examples of primary element types include orifice meters, nozzle meters, venturi meters, wedge meters and v-cone meters.

RFID tags 20a and 20b store identifying information associated with process components 18a and 18b, respectively. RFID tags 20a and 20b may be either "passive" or "active". A passive RFID tag does not have an independent power source, and therefore must rely on energy provided by hand-held RFID transceiver 14 in order to transmit stored information. Passive RFID tags typically cannot be written with data, operate at shorter ranges, and store less data than their active RFID tag counterparts (e.g., 128 bits of data). An active RFID tag has an independent power supply, allowing the active RFID to transmit data without requiring power from hand-held RFID transceiver 14. Active RFID tags are able to communicate at greater distances, and can store greater amounts of data (e.g., 1 megabyte (Mbyte)).

Data stored by RFID tag 20a includes identifying information such a part or model number of process component 18a, as well as product specification data that depends on the type of process component being identified. For instance, if process component 18a is a primary element, then RFID tag 20a would store a model number identifying the type of primary element, as well as size and shape data describing the primary element. Different product specification data may be stored to an RFID tag depending on the process component being identified.

To configure process measurement device 16, hand-held RFID transceiver 14 interrogates RFID tags 20a and 20b, which provide hand-held RFID transceiver 14 with identifying information regarding process components 18a and 18b, respectively. Hand-held RFID transceiver 14 then provides the identifying information to process measurement device 16 through a standard analog or digital communication system (e.g., using a HART, Fieldbus, Profibus, Modbus, deviceNet, etc. communication protocol). Process measurement device 16 automatically configures itself based on identifying information provided by hand-held RFID transceiver 14. Depending on process components 18a and 18b connected to process measurement device 16, automatic configuration of process measurement device may include configuration of process application software or process hardware components. Once configured, process measurement device 16 is able to properly interpret process measurement data received from process components 18a and 18b. Process measurement device 16 is also capable of communicating identifying data received from RFID transceiver 14 to control room 15 using a standard analog or digital communication system.

Therefore, when initially configuring process measurement point system 12, an operator equipped with hand-held transceiver 14 provides process measurement device 16 with identifying data, allowing process measurement device to configure itself to properly interpret data provided by process components 18a and 18b. Likewise, an operator charged with replacing a worn process component uses hand-held transceiver 14 to interrogate the worn component, allowing the operator to accurately identify the process component and therefore replace it with the correct replacement part.

In another embodiment, hand-held RFID transceiver 14 includes a database that allows hand-held transceiver 14 to determine based on identifying information received from RFID tags 20a and 20b how to configure process measurement device 16. In this embodiment, the ability to configure process measurement device 16 is shifted to hand-held RFID transceiver 14. This embodiment can be implemented in current process measurement point systems in which process measurement devices do not have the ability to automatically configure themselves.

Figure 2B:
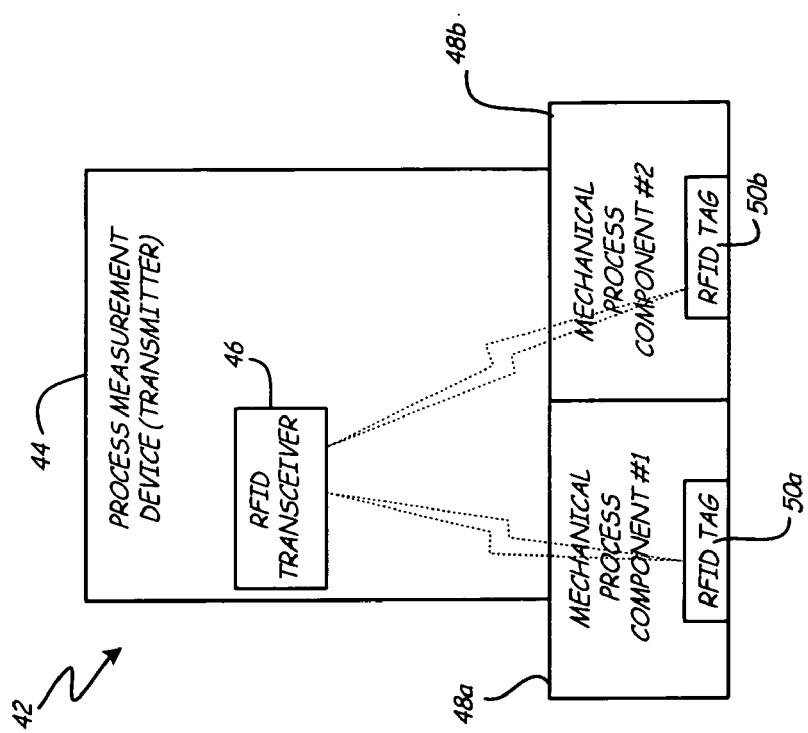
FIGS. 2A and 2B are functional block diagrams of a process measurement point system of the present invention having a process measurement device with a built-in transceiver for interrogating RFID tags located on process components.
Figure 2A:
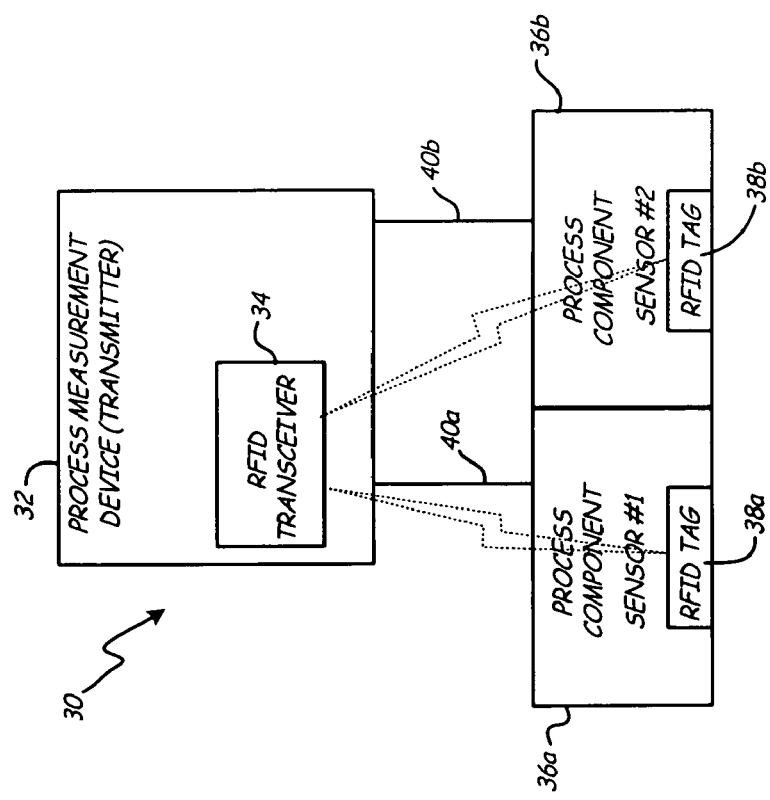

FIGS. 2A and 2B show process measurement point systems 30 and 42, respectively. FIG. 2A shows process measurement point system 30, which includes process measurement device 32 having a built in RFID transceiver 34 for interrogating RFID tags. Process measurement device 32 is connected to receive electrical input from process component sensors 36a and 36b (a type of process component that provides electrical input to process measurement device 32). Process component sensors 36a and 36b are equipped with RFID tags 38a and 38b, respectively. FIG. 2B shows process measurement point system 42, which includes process measurement device 44 having a built in transceiver 46 for communication with RFID tags. Process measurement device 44 is connected to receive mechanical input from mechanical process components 48a and 48b. Process components 48a and 48b are equipped with RFID tags 50a and 50b, respectively.

As shown in FIG. 2A, process measurement device 32 receives electrical input from process component sensors 36a and 36b. In other embodiments, process measurement device 32 may receive input from any number of sensors. In order to properly interpret the input provided by process component sensors 36a and 36b, process measurement device 32 must be configured based on the identity of process component sensors 36a and 36b. For instance, in one embodiment process component sensor 36a may be a resistive temperature device (RTD), which provides variable resistance based on temperature. Process measurement device 32 provides a voltage across the RTD using input/output lines 40a and measures the resulting current. The measured current is related to the resistance value of the RTD, which is based on sensed temperature. Depending on the type of RTD employed, different temperatures result in different resistance values, and therefore different current values in response to a supplied voltage. Therefore, process measurement device 32 must be configured based on the type of RTD employed.

In another embodiment, process component sensor 36a may be a thermocouple (TC), which provides a voltage between input/output lines 40a that varies, based on the sensed temperature. Depending on the type of TC employed, different temperature values may result in different voltage values. Furthermore, depending on whether process component sensor 36a is a RTD device or TC device will determine the hardware configuration used to receive input from sensor 36a. For instance, if process component sensor 36a is a RTD device, then process measurement device 32 must be configured to provide a voltage to sensor 36a, and measure the resulting current. In contrast, if process component sensor 36a is a TC device, then process measurement device does not need to provide a voltage, but instead measures the voltage between input/output lines 40a. Therefore, it is important that process measurement device be provided with the correct identity of process component sensor 36a (RTD, TC, or other).

Likewise, as shown in FIG. 2B, process measurement device 44 receives mechanical input from process components 48a and 48b. In order to properly interpret the input provided by process components 48a and 48b, process measurement device 44 must be configured based on the identity of process components 48a and 48b. For instance, as described with respect to FIG. 1 above, if process component 48a is a primary element, the type, size, and geometry of the primary element would be required to configure process measurement device 44.

Figure 3A:
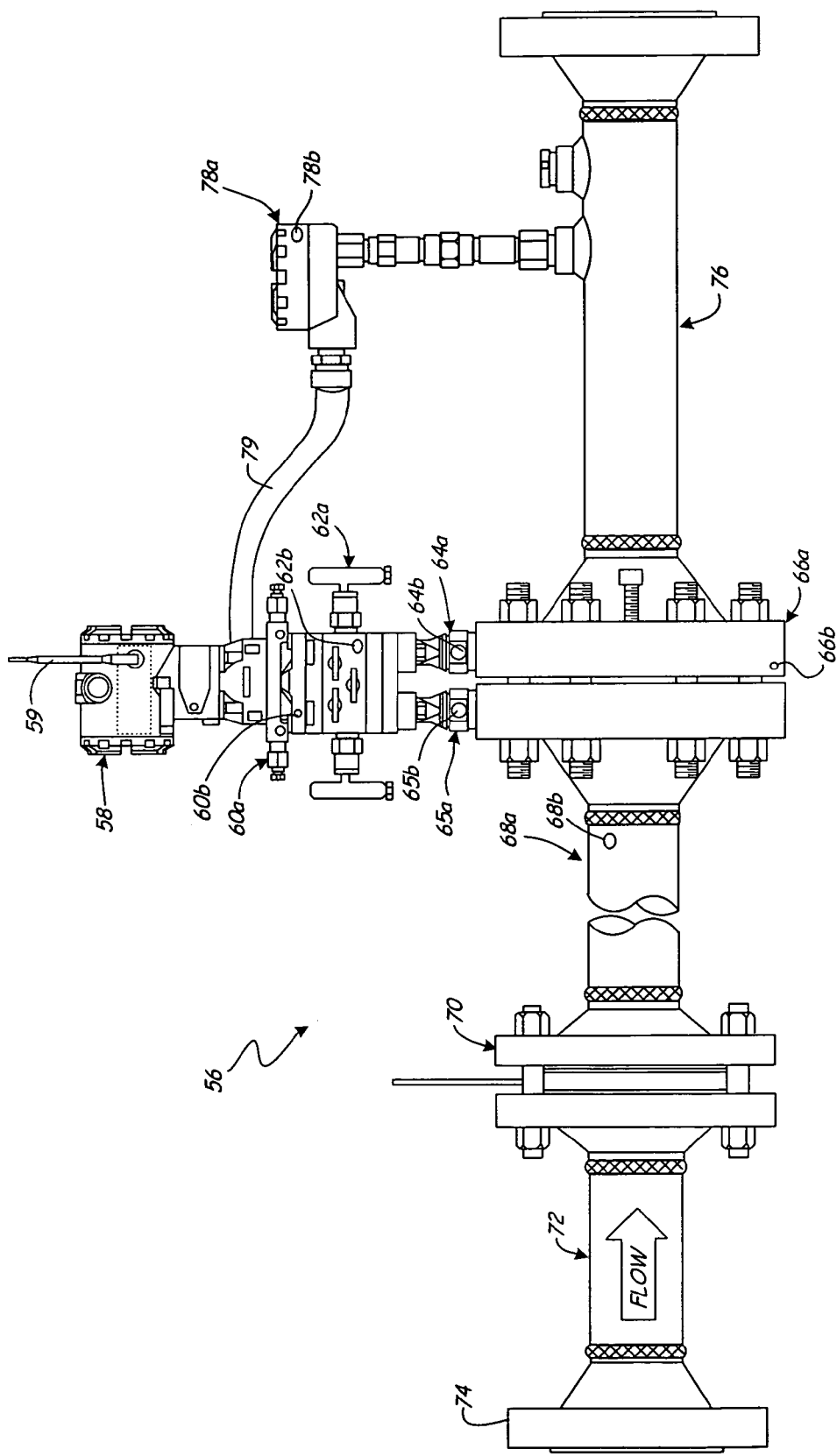
FIG. 3A is a schematic diagram of a process measurement point system of the present invention illustrating an exemplary implementation of the present invention.
Figure 3B:
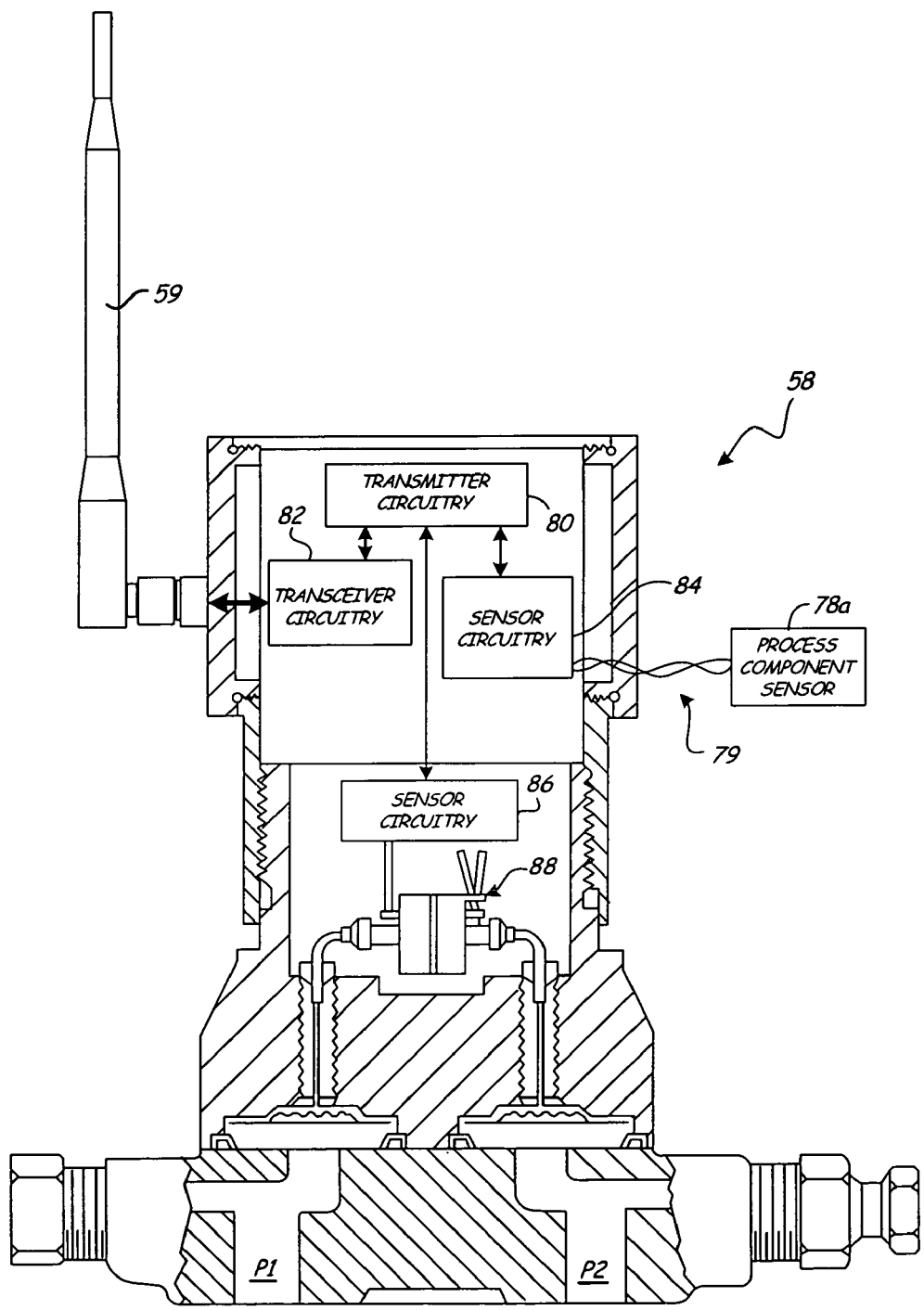
FIG. 3B is a profile of a process measurement device shown in FIG. 3A, including functional diagram of circuitry located within the process measurement device.

Process measurement point systems 30 and 42, as shown in FIGS. 2A and 2B, illustrate the ability of process measurement devices 32 and 44 to automatically configure themselves using built-in transceivers 34 and 46, respectively. This obviates the need for an operator to manually configure process measurement device 32. In one embodiment, process measurement device 32 is capable of periodically polling RFID tags 38a and 38b. If sensor 36a is replaced with a new sensor (having a new associated RFID tag), process measurement device 32 determines whether the correct type of sensor replaced sensor 36a. If the situation arises, process measurement device 32 re-configures itself based on a new type of sensor used to replace sensor 36a. Process measurement device 32 also communicates identifying data obtained by RFID transceiver 34 to a control room via a standard analog or digital communication system. This obviates the need for an operator to physically travel to process measurement point system 32 to manually identify process components connected to process measurement device 32. Process measurement point system 42 of FIG. 2B would include the same capabilities discussed with respect to process measurement point system 30 of FIG. 2A FIGS. 3A and 3B show process measurement point system 56, which includes process measurement device 58, RFID transceiver antenna 59, flange 60a (and accompanying RFID tag 60b), manifold 62a (and accompanying RFID tag 62b), connecting pipes 64a and 65a (and accompanying RFID tags 64b and 65b, respectively), bolted on housing supporting primary element 66a (and accompanying RFID tag 66b), flow pipe 68a (and accompanying 68b), flow conditioner 70, flow pipe 72, flange 74, flow pipe 76, thermowell and process component sensor 78a (and accompanying RFID tag 78b), and conduit 79 (carrying input/output line connecting process component sensor 78a to process measurement device 58). Process component sensor 78a would typically be located within the thermowell, therefore, they are referred to together as thermowell and process component sensor 78a. FIG. 3B is a functional diagram of circuitry located within process measurement device 58. Process measurement device includes transmitter circuitry 80, RFID transceiver circuitry 82, sensor circuitry 84 for receiving input from process component sensor 78a, capacitive differential pressure sensor 88, and sensor circuitry 86 for interpreting input from different pressure sensor 88. In this embodiment, RFID transceiver 59 and transceiver circuitry 82 are included with process measurement device 58, although in other embodiments, RFID transceiver circuitry may be located within a hand-held RFID transceiver located external to process measurement device 58.

In the embodiment shown in FIGS. 3A and 3B, process measurement point system 56 measures pressure present on both sides of primary element 66a. Based on measured pressures and type of primary element employed, process measurement device 58 is able to determine flow rate associated with process fluid flowing through pipes 72, 68a, and 76 (collectively, "the pipeline"). Primary element 66a acts to restrict the flow of the process fluid as it moves through the pipeline. Connecting pipes 64a and 65a provide the process fluid from either side of primary element 66a to process measurement device 58 through manifold 62a and flange 60a.

As shown in FIG. 3B, pressure P1 associated with the process fluid on the left side of primary element 66a is provided to one side of pressure sensor 88, while pressure P2 associated with process fluid located on the right side of primary element 66a is provided to the opposite side of pressure sensor 88. Pressure sensor 88 has a capacitance that changes as a function of pressures P1 and P2. Sensor circuitry 86 converts the capacitance into an electrical signal representative of sensed differential pressure (or flow rate) of the process, and provides the electrical signal to transmitter circuitry 80, which communicates the differential pressure or the flow rate process data to a control room. This can be accomplished using a process control loop such as a two-wire loop using HART® or Fieldbus™ protocols, wireless control loop or any other appropriate communication loop. Process application software employed by sensor circuitry 86 must be properly configured based on the type of primary element 66a being used in order to provide meaningful data. Therefore, it is necessary to properly identify and communicate identifying data to process measurement device 58.

As shown in FIG. 3B, process measurement device 58 includes a built in RFID transceiver 59 and corresponding transceiver circuitry 82 for interrogating RFID tags. This allows process measurement device 58 to be automatically self-configured based on identifying information received by RFID circuitry 82 regarding process components (such as primary element 66a). Thus, RFID transceiver 59 interrogates RFID tag 66b (as well as other RFID tags) to obtain identifying information stored on RFID tag 66b regarding the type, size and geometry of primary element 66a. Identifying information received by RFID transceiver 59 is communicated via transceiver circuitry 82 to transmitter circuitry 80, which uses the identifying information to configure process application software located on sensor circuitry 86.

In addition to mechanical input received regarding pressure, process measurement device also receives electrical input regarding temperature of process fluids from process component sensor (not visible in this view) located within thermowell 78a. The process component sensor provides an electrical input via standard analog or digital communication lines located within conduit 79 to sensor circuitry 84 based on the measured temperature of process fluids contacting thermowell 78a. RFID tag 78b is located on thermowell 78a and stores identifying information associated with the process component sensor. RFID transceiver 59 interrogates RFID tag 78b to obtain identifying information with respect to the sensor, and provides this information (via transceiver circuitry 82) to transmitter circuitry 80, which configures hardware or software associated with sensor circuitry 84. For instance, if the sensor is an RTD device, transmitter circuitry 80 configures hardware within sensor circuitry 84 to provide the required voltage to the RTD and measure the respective current through the RTD device. In contrast, if the sensor is a TC device, transmitter circuitry 80 configures hardware within sensor circuitry 84 to measure the voltage across the TC device.

RFID transceiver 59 also interrogates other RFID tags associated with other components of process measurement point system 56, such as flange 60a, manifold 62a, connecting pipes 64a and 65a, and flow pipes 68a. Depending on the application, identification data associated with some of the process components (e.g., manifold 62a) is not required to configure process measurement device 58. However, the ability to correctly identify and provide this data to the control room provides a number of benefits; such as ability to order replacement parts without needing to send an operator into the field environment to manually read part numbers from process components. It also provides a continuous inventory of all process components located in the field.

Although FIGS. 3A and 3B illustrated an application for measuring flows in the pipeline and temperature of process fluids, the present invention may be implemented in a number of other applications that employ process components. For example, process components may be used in level detection applications, in which process components measure pressure of process fluids within a tank. A process measurement device connected to the process components and properly configured based on the process components, determines the level of fluid in the tank based on the pressure measurement provided. The use of RFID tags carrying identifying information associated with the process components allows process measurement device to be properly configured based on the connected process components. Other applications that may make use of the present invention include guided wave radar process components that provide data regarding levels of process fluids in a tank. A process measurement device receiving input from a guided wave radar process component must be configured based on the type of connected guided wave radar component.

Figure 4:
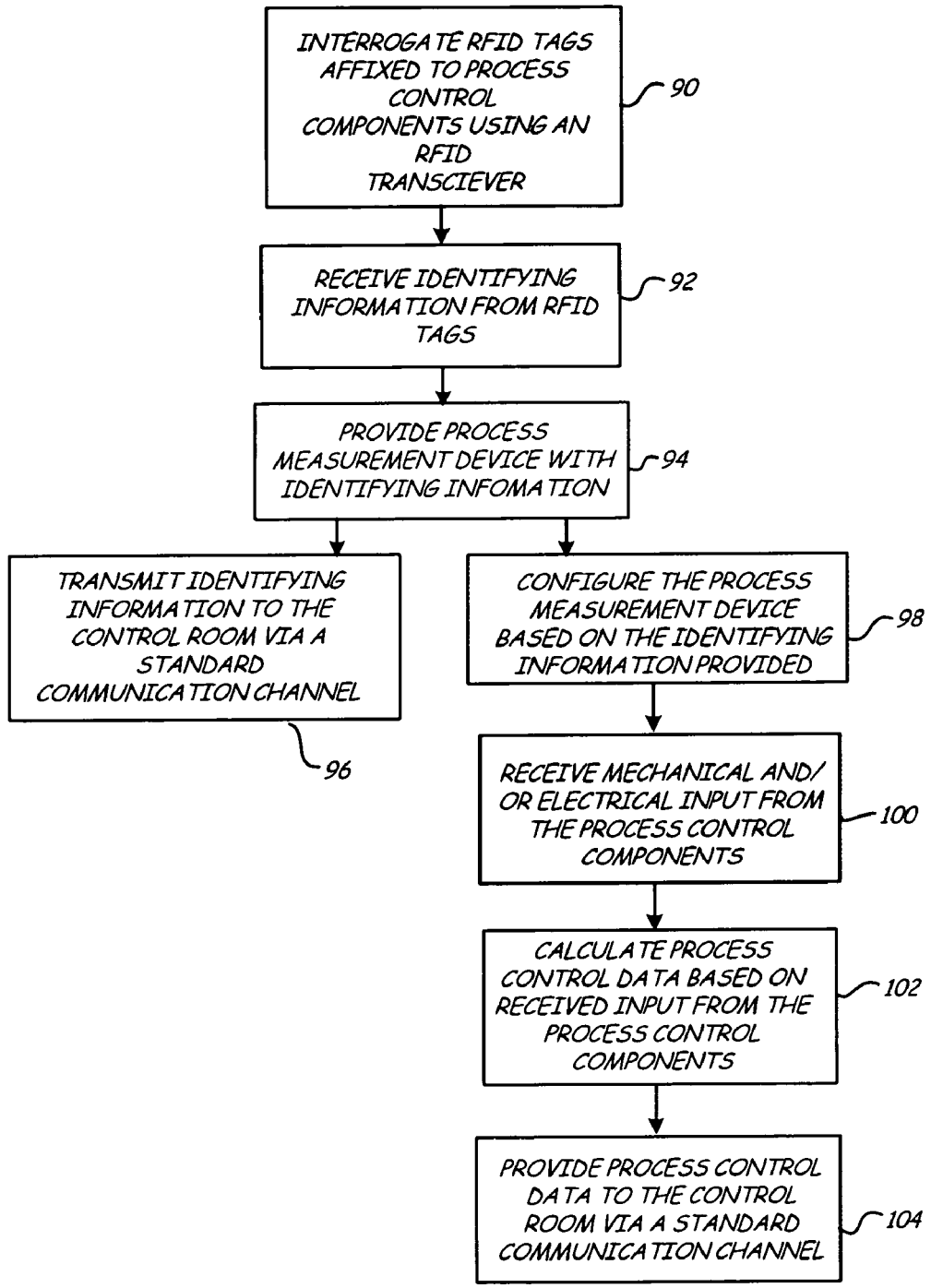
FIG. 4 is a flowchart illustrating the configuring of the process measurement point system based on identifying information received from RFID tags located on process components.

FIG. 4 is a flowchart illustrating operation of the present invention. At step 90, a transceiver interrogates RFID tags affixed to process components and sensors. The transceiver may be a hand-held transceiver as discussed with respect to FIG. 1, or a built-in transceiver as discussed with respect to FIGS. 2A, 2B and 3. The RFID tags may be either passive or active, depending on the requirements of the application. At step 92, the transceiver receives identifying information from RFID tags associated with each process component and sensor. At step 94, the identifying information or data is communicated from the RFID transceiver to the process measurement device 16. If the RFID transceiver is a hand-held RFID transceiver then identifying information is communicated through a standard analog or digital communication system (e.g., using a HART, Fieldbus, Profibus, Modbus, deviceNet, etc. communication protocol). In one embodiment, in which the RFID transceiver is a hand-held RFID transceiver, configuration of the process measurement device is performed directly by the hand-held RFID transceiver, and the step of providing process measurement device with identifying information is not required.

At step 96, the identifying information provided to the process measurement device is further provided to the control room. In one embodiment, identifying information is sent to the control room upon request. In other embodiments, identifying information is sent to the control room upon initial configuration of the process measurement device, or following a change in process components connected to the process measurement device.

At step 98, process measurement device is configured based on identifying information received by the transceiver. As discussed above, in one embodiment, the hand-held transceiver configures the process measurement device based on identifying information received from RFID tags. In other embodiments, the hand-held transceiver provides identifying information to the process measurement device, which automatically configures itself based on the identifying information provided. In other embodiments, the process measurement device includes a built-in transceiver, which obviates the use of a hand-held RFID transceiver to provide process measurement device with identifying information.

By configuring the process measurement device, hardware or software located within process measurement device is configured to properly interpret mechanical and electrical data provided by process components connected to the process measurement device.

At step 100, the process measurement device receives mechanical and/or electrical input from the process components. Based the input received by the process components and the identifying data provided by the transceiver, the process measurement device calculates process data at step 102. Accurate identification of process components connected to the process measurement device results in the process measurement device correctly interpreting input received from the process components. At step 102, the process measurement device provides process data to the control room.

Therefore, a process measurement point system has been described that provides wireless identification of process components and sensors connected to a process measurement device. RFID tags associated with each process component stores identifying information with respect to the particular process component or sensor, such as model number and identifying characteristics. The process measurement device is provided with data identifying the process components and sensors, allowing process measurement device to automatically configure itself to properly interpret mechanical and electrical input received from the process components and sensors. This prevents an operator from having to manually configure the process measurement device based on visual inspection of process components, an error prone and tedious process. Furthermore, identifying information received with respect to process measurement devices and sensors is provided by the process measurement device to a control room, providing the control room with an inventory of all process components and sensors employed at a particular process measurement point system. This allows new parts to be ordered without having to send an operator to the location of the process component to determine the identification of the component.

Although the present invention has been described with reference to preferred embodiments, workers skilled in the art will recognize that changes may be made in form and detail without departing from the spirit and scope of the invention.

The invention claimed is:

1. A process measurement point system for monitoring a process fluid in an industrial process, the system comprising:
   a sensor for providing a sensor output as a function of a sensed parameter of the process fluid;
   a process component for interacting with the process fluid wherein characteristics of the process component affect the sensed parameter of the process fluid, the process component including a radio frequency identification (RFID) tag that stores identifying information regarding the process component;
   a process measurement device configured to calculate process data based on the sensor output; and
   a RFID transceiver for interrogating the RFID tag associated with the process component, the RFID transceiver including memory for storing configuration data and a communication system for providing configuration data to the process measurement device based on the identifying information provided by the RFID tag, wherein the process measurement device is configured by the received configuration data to calculate process data based on the sensor output.

2. The process measurement point system of claim 1, wherein the RFID transceiver is a hand-held RFID transceiver device including a communication system for providing the process measurement device with the selected configuration data.

3. The process measurement point system of claim 1, wherein the process measurement device includes:
   a sensor circuit connected to receive the sensor output from the sensor; and
   a transmitter circuit connected to receive calculated process data from the sensor circuit and the configuration data from the RFID transceiver, wherein the transmitter circuit configures the sensor circuit based on the configuration data received from the RFID transceiver.

4. The process measurement point system of claim 3, wherein the sensor circuit operates process application software that is configured by the transmitter circuit based on configuration data received from the RFID transceiver.

5. The process measurement point system of claim 3, wherein the sensor circuit includes hardware that is configured by the transmitter circuit based on configuration data received from the RFID transceiver.

6. The process measurement point system of claim 1, wherein the process component is a primary element.

7. The process measurement point system of claim 6, wherein the identifying information associated with the primary element includes at least one of the following: primary element type, primary element size, and primary element shape.

8. The process measurement point system of claim 1, wherein the process component is a sensor.

9. The process measurement point system of claim 8, wherein the identifying information associated with the sensor includes sensor type.

10. A method of initializing a process measurement point system having a sensor for providing a sensor output as a function of a sensed parameter of a process fluid, a process component for interacting with the process fluid, and a process measurement device configured to calculate process data based on the sensor output, wherein characteristics of the process component affects the sensed parameter of the process fluid, the method comprising:
   interrogating a radio frequency identification (RFID) tag located on a process component to obtain identifying information regarding the process component;
   selecting configuration data based on the obtained identification information; and
   configuring the process measurement device based on the selected configuration data to calculate process data based on the sensor output provided by the sensor.

11. The method of claim 10, further including:
   providing the process data calculated by the process measurement device to a control room system.

12. The method of claim 10, wherein interrogating the RFID tags includes:
   using a hand-held RFID transceiver to interrogate the RFID tag located on each process component.

13. The method of claim 12, wherein configuring the process control device includes:
   connecting the hand-held RFID transceiver to the process measurement device wherein the hand-held RFID transceiver selects the configuration data and configures the process measurement device based on the identifying information.

14. The method of claim 12, wherein configuring the process measurement device includes:
   providing the identifying information to the process measurement device, wherein the process measurement device selects the configuration data for configuration itself based on the identifying information.

15. The method of claim 10, further including:
   providing the process measurement device with identifying information, wherein the process measurement device selects the configuration data for configuring itself based on the received identifying information.

16. The method of claim 10, further including:
   providing the identifying information received from the RFID tags to a control room system.

17. The method of claim 10, wherein configuring the process measurement device includes:
   providing the configuration data to the process measurement device.

18. The method of claim 17, further including:
   configuring process application software within a sensing circuit connected to receive the sensor output from the sensor based on the configuration data provided to the process measurement device.

19. The method of claim 18, further including:
   configuring hardware components within the sensing circuit connected to receive the sensor output from the sensor based on the configuration data provided to the process measurement device.

20. A process system, comprising:
   a control room; and
   a plurality of process measurement point systems connected to provide process data to the control room, wherein each of the plurality of process measurement point systems comprises:
      a sensor for providing a sensor output as a function of a sensed parameter of the process fluid;
      a plurality of process components for interacting with the process fluid wherein characteristics of the process component affect the sensed parameter of the process fluid, wherein each of the plurality of process components includes a radio frequency identification (RFID) tag that stores identifying information regarding the process component;
      a process measurement device configured to calculate process data based on the sensor output, and to transmit the calculated process data the control room via a communication system; and
      an RFID transceiver for interrogating the RFID tag associated with each of the plurality of process components, wherein identifying information received from the RFID tags is provided to the process measurement device to configure the process measurement device to calculate the process data based on the sensor output, wherein the process measurement device also transmits identifying information received from the RFID tags to the control room.

21. The process system of claim 20, wherein the RFID transceiver is a hand-held RFID transceiver including a communication system for providing the process measurement device with the identifying information received from the RFID tags.

22. The process system of claim 20, wherein the RFID transceiver is included within the process measurement device.

23. The process measurement point system of claim 1, wherein the sensor includes a radio frequency identification (RFID) tag that stores identifying information regarding the sensor, wherein the process measurement device is further configured based on the received identity of the sensor.

* * * * *

UNITED STATES PATENT AND TRADEMARK OFFICE
CERTIFICATE OF CORRECTION

PATENT NO. : 8,212,655 B2  Page 1 of 1
APPLICATION NO. : 11/394894
DATED : July 3, 2012
INVENTOR(S) : Nathan Steven Nelson et al.

It is certified that error appears in the above-identified patent and that said Letters Patent is hereby corrected as shown below:

Col. 10, Line 37
  Insert --to-- after "data"

Signed and Sealed this
Twenty-sixth Day of March, 2013

Teresa Stanek Rea
*Acting Director of the United States Patent and Trademark Office*